United States Patent Office 3,403,128
Patented Sept. 24, 1968

3,403,128
STABILIZATION OF ESTER-CONTAINING SYNTHETIC RESINS
Gerhard Berndt, Monheim, Ernst Grigat, Cologne-Stammheim, Rolf Putter, Dusseldorf, and Karl-Arnold Weber, Cologne-Stammheim, Germany, assignors to Farbenfabriken Bayer Aktiengesellschaft, Leverkusen, Germany, a corporation of Germany
No Drawing. Filed Aug. 18, 1966, Ser. No. 573,210
Claims priority, application Germany, Sept. 2, 1965, F 47,074
6 Claims. (Cl. 260—45.8)

ABSTRACT OF THE DISCLOSURE

A stabilized synthetic resin containing ester groups having incorporated therein a stabilizing amount of an organic cyanate having the formula R—(OCN)$_n$ wherein R is a substituted or unsubstituted aromatic group having from 6 to 24 carbon atoms and $n$ is an integer of 1 to 6.

This invention relates to synthetic resins, particularly to synthetic resins containing ester groups and more particularly to the stabilization of ester-containing synthetic resins.

Synthetic resins containing ester groups have been widely used both as polymers, such as polyvinyl acetate and as poly addition products, e.g. of polyesters and polyisocyanates, or as alkyd resins or unsaturated polyester resins for the production of porous or homogeneous synthetic resins having a rubber elasticity, as lacquers, films, casting resins and foam plastics. However, these synthetic resins containing ester groups are unstable and undergo hydrolytic splitting in the presence of heat and moisture.

Heretofore, carbodiimides have been used as stabilizing agents in ester-containing resins to prevent degradation in the presence of heat and moisture. In addition, carbodiimides have been used to improve the ageing characteristics of ester-containing synthetic resins. However, these carbodiimides have a reasonably high vapor pressure which tend to exhibit a migration phenomena in the resins. Also, it is difficult to use carbodiimides in processes, for example, where cross-linking of polyesters must be carried out by polyfunctional isocyanates, due to the fact that the carbodiimides will retard cross-linking, especially where small quantities of water are necessary in order for the reaction to proceed to completion.

Therefore, it is an object of this invention to provide a synthetic resin having a stabilizing agent which will not retard cross-linking with polyfunctional isocyanates. Another object of this invention is to provide a method for stabilizing synthetic resins containing ester groups. Still another object of this invention is to provide a method for stabilizing polyesters against heat and moisture. Still another object of this invention is to provide a method for stabilizing compositions containing polyesters against hydrolysis. A further object of this invention is to provide a synthetic resin composition containing ester groups which is stabilized against hydrolysis. A still further object of this invention is to provide stabilized coatings, foams and elastomers which have improved resistance to heat, moisture and ageing.

The foregoing objects and others which will become apparent from the following description are accomplished in accordance with the invention, generally speaking, by providing a method for stabilizing synthetic resins containing ester groups against heat and moisture by incorporating therein a stabilizing amount of an aryl cyanate of the formula R—(OCN)$_n$ wherein R is a substituted or unsubstituted aromatic group having from 6 to 24 carbon atoms and $n$ is an integer of from 1 to 6. The aromatic group may comprise one or more benzene nuclei which may be condensed, have hetero atoms, or be substituted with alkyl, cycloalkyl, aralkyl, aryl, dialkylamino, acylamino, arylamino, halogeno, nitro, sulfonic acid, sulfonic acid ester, sulfonic acid amide, carboxylic acid, carboxylic acid ester, carboxylic acid amide, alkoxy, phenoxy, acyloxy, acyl, aldehydo, sulfono, rhodano, isorhodano, alkylmercapto, arylmercapto, acylmercapto and cyano radicals.

In other words, we have found that organic cyanates, preferably aryl cyanates are more effective as stabilizing agents against heat and moisture in ester-containing synthetic resins than carbodiimides. This may be attributed to the fact that aryl cyanates when compared with carbodiimides of comparable molecular weights, have a greater number of active cyanate groups, thereby providing a greater protective action with a given quantity of stabilizer. In addition, these aryl cyanates remain stable in ester-group-containing synthetic resins even at elevated reaction temperatures as well as at elevated processing temperatures. Furthermore, migration of the cyanic acid ester to the surface of the synthetic resins which have undergone complete reaction is not observed, even where low molecular weight aryl cyanates are used.

These aryl cyanates may be prepared in accordance with the procedure described in DAS 1,195,764 or Chemische Berichte 97 (1964) 3012–3017.

Examples of mono- or polyvalent aryl cyanates which have a stabilizing effect on ester groups are phenyl cyanate, 1,3-, 1,4-bis-cyanatobenzene, 1,3,5-triscyanatobenzene, mono- and polyalkylphenylcyanates, for instance 2-, 3- or 4-methyl-, ethyl-, n-propyl-, isopropyl-, n-butyl-, isobutyl-, tert.-butyl-, n- or iso-pentyl-, n- or isohexal-, n- or isoheptyl-, n- or isooctyl-, n- or isononyl-, n- or isodecyl-, n- or isododecyl-, n- or isopalmityl-, n- or isostearyl-, ethene-, propene-, butene- and ethinphenylcyanate, 1-methyl-3,5-dicyanatobenzene, 2,3-, 2,4-, 2,5-, 2,6-, 3,4-, 3,5-dimethyl-, diethyl-, dipropylphenylcyanates; 2,3,4-, 2,3,5-, 2,3,6-, 3,4,5-, 2,4,6-trimethyl-, triethyl- and tripropylphenylcyanates; 2,3,4,6-, 2,3,4,5-, 2,3,5,6- tetramethyl-, tetraethyl- and tetrapropylphenylcyanates and 2,3,4,5,6 - pentamethylphenylcyanates. The above-mentioned alkyl radicals also can be mixed, e.g. 2,6-dimethyl-4-tert.-butylphenylcyanate.

Cycloalkylphenylcyanates, for instance 2-, 3- or 4-cyclohexylphenylcyanate, 4,4'-biscyanato-bisphenylcyclohexane-(1,1); substituted alkylphenylcyanates, for instance 4-chlormethyl-, 4-hydroxymethyl- and 3-trifluoromethyl-phenylcyanate; aralkylphenylcyanates, for instance 2-, 3- or 4-benzylphenylcyanates, 4,4'-biscyanato-bisphenylmethane, 4,4'-biscyanato-bisphenylmethylmethane, 4,4'-biscyanato - bisphenyl - bismethylmethane, 4,4'-biscyanato-bisphenylethane; arylphenylcyanates, for instance 2-, 3- or 4-cyanatodiphenyl, 4,4'-dicyanatodiphenyl; alkyl, aryl, acyl-aminophenylcyanates, for instance 2-, 3- or 4-dimethylamino-, 2-, 3- or 4-diethylamino-, 2-, 3- or 4-acetylamino-, 2-, 3- or 4-benzoylamino-, 2-, 3- or 4-methacroylamino-, 4-dimethylamino-3-methyl-, 3-dimethylamino-4-methyl-, 4-dimethylamino-3,5-dimethylphenylcyanate, N-methyl-N-formyl-4-aminophenylcyanate, N-methyl-N-formyl-4-amino-3-methylphenylcyanate; halogenophenylcyanates, for instance 2-, 3- or 4-chloro- or bromophenylcyanate, 2,3-, 2,4-, 2,5-, 2,6-, 3,4-, 3,5-dichloro-(bromo)-phenylcyanate, 2 - methyl - 5 - chloro-, 2 - methyl - 6-chloro-, 3-methyl-4-chloro-, 5-methyl-2-chloro-, 2-methyl-4-chloro, 2-methyl-3-chlorophenylcyanate, 3,5,3',5'-tetrachloro-2,2'-dicyanatodiphenyl; nitrophenylcyanates, for instance 2-, 3- or 4-nitrophenylcyanate, 2-methyl-5-nitro-, 4-methyl-2-nitro-, 3-methyl-4-nitro-, 4-methyl-3-nitro-, 3,5-dimethyl-4-nitrophenylcyanate. Cyanates from phenylsulfonic and phenylcarbonic acids, their esters, amides, hydrazides, for instance 3- or 4-cyanatobenzoic acid or benzosulfonic acid, 2-, 3- or 4-cyanatobenzoic acid- (or benzosulfonic acid) methylester, -ethylester, -propylester, -isobutylester, -phenylester, -naphthylester, -halogenphenylester, 2-cyanato-5-chlorobenzoic acid ester, 2-cyanato-3-methylbenzoic acid ester, 5,5'-methylen-bis-(2-cyanatobenzoic acid phenylester), 2-, 3- or 4-cyanatobenzoic acid dimethylamide, -diethylamide, -morpholylamide, -piperidylamide, -dimethylhydrazide; alkyloxy-, aryloxy-, acyloxyphenylcyanates, for instance 2-, 3- or 4-methoxy-, ethoxy-, propoxy-, isopropoxy-, butoxy-, phenoxy-, acetoxy-, benzoxy-, N,N-dialkylcarbamato-, 4-allyl-2-methoxy-phenylcyanate; acyl- or aldehydophenylcyanates, for instance 2-, 3- or 4-cyanatobenzaldehyde, 2-, 3- or 4-acetyl-, propionyl-, benzoyl-phenylcyanate, 4-acetyl-1,3-dicyanatobenzene; cyanophenylcyanates, for instance 2-, 3- or 4-cyanophenylcyanate, 2,3-dicyano-1,4-dicyanato-benzene.

Phenylcyanates with S-containing substituents, for instance 2-, 3- or 4-methylmercapto-, ethylmercapto-, propylmercapto-, phenylmercapto-, acetylmercapto-, benzoylmercaptophenylcyanates, 3- or 4-rhodanophenylcyanates, 2,4-bismethylmercapto-3-methylphenylcyanate,

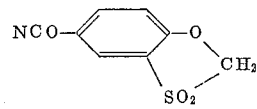

Cyanates from carbocyclic aromatic systems, other than phenyl: α- or β-naphthylcyanates, 1,3-, 1,4-, 1,5-, 1,6-, 1,7-, 1,8-, 2,3-, 2,6-, 2,7-dicyanatonaphthalene, 2,2'-dicyanatobisnaphthyl, α- or β-cyanatoanthraquinone, 1,4- or 1,5 - dicyanatoanthraquinone, cyanatophenanthrene. These may bear the same substituents listed before in the phenyl series.

Cyanates from heterocyclic systems, for instance 3-, 5-, 6-, 7- or 8-cyanatoquinoline, 1-, 2-, 3- or 4-cyanatocarbazole, 5-cyanato-1-phenyl-3-methylpyrazole, 4-, 5-, 6-, or 7-cyanatobenzotriazole, -benzothiazole, -benzimidazole, -benzopyrazole and the cyanic acid esters of the following alcohols: β,β,β-trichloroethanol, β,β,β-trifluoroethanol, β,β,β-tribromoethanol, butin-(2)-diol-1,4, acetylacetone, acetacetic acid ester, cyclohexene-(1)-ol-(1)-on-(3), hydroxyacetone, 2-nitroethanol, β,β-dichloroethanol, hydroxyacetonitrile, hydroxy acetic acid ethyl ester.

By additional substitution on the aryl cyanates, the reactivity of the —OCN group may be further modified in order to adapt it to the requirements.

Preferably polyfunctional cyanic acid esters may be used as stabilizers in order to enhance the stabilizing effect due to the greater number of cyanate groups for a given amount of stabilizing agent.

In addition, moreover, it is possible and also in some cases desirable to use cyanic acid esters containing long chained aliphatic hydrocarbons in order to impart water-repellent properties to the end product.

The aryl cyanates are particularly useful in the stabilization of ester-containing compositions and may be used alone or in admixture as such or as a solution in organic solvents. Examples of suitable solvents are acetone, ethyl acetate, benzene, chloroform, alcohol, dimethylformamide, carbon tetrachloride, acetonitrile, dimethylsulphoxide. The concentration of the solution is not critical and depends on the particular requirements in each case.

The aryl cyanate stabilizing agents may, if desired, be incorporated in the resin composition by any suitable technique, such as, by addition to one of the starting components for the production of the synthetic resin or they may be added during the production of the synthetic resin. Where technically possible, these stabilizing agents may be incorporated in the completed synthetic resin. The amount of aryl cyanate incorporated in the resin is not critical; however, a sufficient amount should be used in order to stabilize the resin against hydrolytic degradation. Generally, an amount between about 0.005 and 0.1 mol, preferably between about 0.01 and about 0.05 mol of aryl cyanate per 100 grams of synthetic resin is sufficient to stabilize the ester groups in the synthetic resin.

Any compound containing ester linkages

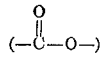

may be stabilized against hydrolytic degradation in accordance with this invention. Thus any ester composition obtained by condensing any organic acid such as acetic acid, propionic acid, phenyl acetic acid, benzoyl acetic acid, pyruvic acid, alpha-hydromuconic, propionyl acetic acid, levulinic acid, 1,2-keto stearic acid, 1,3-keto behenic acid, aldovaleric acid, hexahydrobenzoic acid, cyclohexane-1,2-dicarboxylic, cyclohexane-1,4-dicarboxylic, naphthylene-1,2-dicarboxylic, brassylic acid, phenylmalonic acid, ethylglycolic acid, thioglycolic acid, beta-chloropropionic acid, glutaconic acid, ethoxymalonic acid, malic acid, aspartic acid, polyacrylic acid, cinnamic acid, benzene tricarboxylic acid, adipic acid, 6-amino caproic acid, succinic acid, suberic acid, sebacic acid, oxalic acid, methyladipic acid, glutaric acid, pimelic acid, azelaic acid, phthalic acid, terephthalic acid, isophthalic acid, malonic acid, maleic acid, fumaric acid, citraconic acid, itaconic acid, etc. with alcohols, such as methyl alcohol, ethyl alcohol, propyl alcohol, isopropyl alcohol, n-butyl alcohol, isobutyl alcohol, secondary butyl alcohol, teritary butyl alcohol, amyl alcohol, hexyl alcohol, octyl alcohol, decyl alcohol, lauryl alcohol, myristyl alcohol, cetyl alcohol, stearyl alcohol, allyl alcohol, methallyl alcohol, crotyl alcohol, 2-propyn-1-ol, oleyl alcohol, geraniol, citronellol, linalool, diacetone alcohol, ethylene glycol monoethyl ether, cyclohexanol, naphthenic alcohols, benzyl alcohol, tolyl alcohol, phenylethyl alcohol, octadecylbenzyl alcohol, ethylene glycol, propylene glycol, 1,4-butanediol, 1,3-butanediol, 1,5-pentanediol, 1,6-hexanediol, bis-(hydroxymethyl)-cyclohexane, diethylene glycol, 2,2-dimethyl propylene glycol, 1,3,6-hexanetriol, trimethylol propane, pentaerythritol, sorbitol, glycerine and the like. The method of stabilizing compositions containing ester groups is applicable not only to monoesters but also to polyesters in accordance with the compounds listed above having a functionality greater than 1. For example, where any of the di- or polycarboxylic acids are reacted with the di- or polyhydric alcohols, a polyester having more than one ester group, of course, will result.

Other compositions containing polyester resins as a reactive component or in admixture can also be stabilized by the process of this invention. For example, compositions such as polyester amides and polyester urethanes can be stabilized. The reaction product of any of the carboxy terminated or hydroxyl terminated esters set forth above can be reacted with a suitable isocyanate to prepare a polyurethane. In the preparation of polyesteramides, the reaction of a carboxylic acid, an alcohol and an amine can be carried out simultaneously or in steps in the manner set forth for the preparation of polyesteramides. Amino alcohols and amino acids can be used in the preparation of polyesteramides. The important feature is, however, that any composition containing ester groups can be stabilized against hydrolysis by the introduction therof of an aryl cyanate.

Any suitable organic polyisocyanate may be used to prepare polyester urethanes which may be stabilized in accordance with this invention.

Any suitable amino compound can be used to prepare polyesteramides such as, for example, hexamethylene diamine, ethylene diamine, propylene diamine, butylene diamine, cyclohexylene diamine, phenylene diamine, tolylene diamine, xylylene diamine, 4,4'-diamino-diphenylmethane, naphthylene diamine, aminoethyl alcohol, aminopropyl alcohol, aminobutyl alcohol, aminobenzyl alcohol, aminoacetic acid, aminopropionic acid, aminobutyric acid, aminovaleric acid, aminophthalic acid, aminobenzoic acid and the like. Of course, the amino compounds may be reacted either simultaneously with the ester forming components or sequentially therewith.

It is also within the scope of this invention that naturally occurring esters may be stabilized against hydrolysis and aging in accordance with this invention such as, for example, castor oil, coconut oil, corn oil, cottonseed oil, horse fat oil, lard oil, wood fat oil, Japan wax mutton tallow, beef tallow, neat's foot oil, palm oil, peanut oil, carnauba wax, spermaceti, beeswax, rapeseed oil, soya bean oil, whale oil, sperm oil and the like. Further, any compositions containing ester groups as well as unsaturation may be stabilized in accordance with this invention. Such compositions may be formed by polymerization, condensation or a combination of both. Any of these unsaturated carboxylic acids mentioned above may be used in the preparation of such polyesters. Further examples of such compositions include polyester resins of polymerizable monomers and unsaturated polyesters, for example, those of fumaric or maleic acid as well as ethylene vinyl ester copolymers, acrylic and methacrylic acid ester polymers and/or their copolymers with vinyl esters, fluorinated acrylic esters and their copolymers, copolymers of acrylonitrile and acrylic acid esters such as methylacrylate and the like. The invention is particularly applicable to the stabilization of polyesters used in the manufacture of synthetic resins which may result in the formation of lacquers, foils, coatings, fibers, foam materials, elastomers or casting resins for molded elements.

The invention is further illustrated but not limited by the following examples in which all parts and percentages are by weight unless otherwise specified.

Example 1

Approximately 100 parts of a polyester prepared from about 14 mols of adipic acid and about 15 mols of diethylene glycol (hydroxyl number 40; acid number 1.0) are reacted in a mixture with about 100 parts of a polyester prepared from about 10 mols of adipic acid and about 11 mols of ethylene glycol (hydroxyl number 55; acid number 1.0) with about 16 parts of toluylene diisocyanate to form a product which is soluble in ethyl acetate to the extent of about 30 percent to form a solution having a viscosity of about 22,000 cp./20° C. To about 100 parts of this solution are added about 5 parts of a 75 percent solution in ethyl acetate of a polyfunctional isocyanate containing 12.5 percent NCO, obtained by reacting about 1 mol of trimethylolpropane and about 3 mols of toluylene diisocyanate, and about 2.5 parts of a 10 percent solution in acetone of an aryl cyanate shown in Table I.

Foils having a thickness of about 0.5 mm. are formed from the mixture by removing the solvent by evaporation. The foils are maintained for about 48 hours at a relative humidity of about 60 percent and a temperature of about 20° C. and then tested for tensile strength and elongation break. The results of these tests are illustrated in Table I (unaged). Other foils are aged for 12 days at a relative humidity of 95 percent and at a temperature of about 70° C. and then tested for tensile strength and elongation break. The results of these tests are shown in Table I (aged). For purposes of comparison the corresponding values obtained with foils produced without a stabilizing agent are also illustrated in Table I.

TABLE I

|  | Tensile strength (kg./cm²) | | Elongation at break (percent) | |
|---|---|---|---|---|
|  | Unaged | Aged | Unaged | Aged |
| Without additive | 380 | 200 | 700 | 810 |
| p-Phenylene dicyanate | 380 | 380 | 650 | 750 |
| m-Phenylene dicyanate | 380 | 380 | 750 | 750 |
| 2,2-bis-(p-cyanatephenyl)-propane | 340 | 310 | 650 | 670 |
| Iso-dodecyl-phenylcyanate | 380 | 219 | 720 | 840 |
| n-Nonyl-phenylcyanate | 400 | 270 | 700 | 750 |

Example 2

An addition product soluble in ethyl acetate to the extent of 30 percent is prepared by reacting about 100 parts of a polyester prepared from about 10 mols of adipic acid and 11 mols of ethylene glycol (hydroxyl number 55; acid number 1.0) with about 8 parts of toluylene diisocyanate. The viscosity of the solution is about 15,000 cp./20° C. To about 100 parts of this solution are added about 5 parts of a 75 percent solution in ethyl acetate of the polyfunctional isocyanate prepared in accordance with Example 1.

The aryl cyanates listed in Table II are added to the solution. Foils obtained from the solution are tested in accordance with Example 1. The results of these tests are shown in Table II.

TABLE II

|  | Tensile strength (kg./cm²) | | Elongation at break (percent) | |
|---|---|---|---|---|
|  | Unaged | Aged | Unaged | Aged |
| Without additive | 420 | 220 | 550 | 600 |
| p-Phenylenedicyanate | 420 | 415 | 500 | 550 |
| 2,2-bis-(p-cyanatephenyl)-propane | 380 | 340 | 530 | 550 |
| n-Nonyl-phenylcyanate | 410 | 290 | 600 | 600 |
| 4-dimethylaminophenylcyanate | 410 | 300 | 600 | 600 |
| 4-dimethylamino-3-methylphenyl cyanate | 400 | 300 | 600 | 610 |

It is of course to be understood that any of the aryl cyanates either singly or in a mixture may be used in the stabilization of synthetic resins containing ester groups. Also other aryl cyanates may be substituted in the examples for those specifically set forth herein.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A stabilized polyester based polymeric composition comprising a polymer having a polyester group and an aryl cyanate of the formula

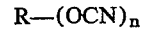

$$R\mathrm{-\!-(OCN)_n}$$

wherein R is an aromatic group having from 6 to 24 carbon atoms and $n$ is an integer of from 1 to 6.

2. The composition of claim 1 wherein the polymeric composition is a polyester.

3. The composition of claim 1 wherein the polymeric composition is a polyurethane.

4. The composition of claim 1 wherein the organic cyanate contains a six membered carboxylic ring.

5. The composition of claim 1 wherein the polymeric composition contains from about 0.005 to about 0.1 mol of organic cyanate per 100 grams of polymer.

6. The composition of claim 1 wherein the aryl cyanate is m-phenylene dicyanate, p-phenylene dicyanate, 2,2-bis-(p-cyanatophenyl)propane, isododecylphenylcyanate, n-nonylphenylcyanate, 4-dimethyl aminophenylcyanate or 4-dimethyl amino-3-methylphenylcyanate.

References Cited

UNITED STATES PATENTS 2,578,653   12/1951   Goppel et al. _____ 260—45.9

DONALD E. CZAJA, *Primary Examiner.*

M. J. WELSH, *Assistant Examiner.*